United States Patent [19]

Ryder et al.

[11] Patent Number: 4,807,750
[45] Date of Patent: Feb. 28, 1989

[54] LATCHING STRUCTURE FOR CONTACT LENS HOLDER

[75] Inventors: Francis E. Ryder, Arab; Rowland W. Kanner, Guntersville, both of Ala.

[73] Assignee: Ryder International Corporation, Arab, Ala.

[21] Appl. No.: 114,420

[22] Filed: Oct. 28, 1987

[51] Int. Cl.⁴ .......................... B54D 81/18; A61L 2/18
[52] U.S. Cl. ..................................... 206/5.1; 134/137; 206/210
[58] Field of Search ..................... 206/205, 210, 5.1, 5; 134/137, 143, 158, 162; 422/300, 301

[56] References Cited

U.S. PATENT DOCUMENTS

| | | | |
|---|---|---|---|
| 3,770,133 | 11/1973 | Thomas | 206/5.1 |
| 3,822,780 | 7/1974 | Ulmer et al. | 206/5.1 |
| 3,856,571 | 12/1974 | Sherman | 206/5.1 |
| 3,880,278 | 4/1975 | Brown | 134/137 |
| 4,011,941 | 3/1977 | Parsons | 206/5.1 |
| 4,091,917 | 5/1978 | Clawson et al. | 206/5.1 |
| 4,200,187 | 4/1980 | Thomas | 206/5.1 |
| 4,328,890 | 5/1982 | Thomas et al. | 206/5.1 |
| 4,396,583 | 8/1983 | LeBoeuf | 422/301 |
| 4,637,919 | 1/1987 | Ryder et al. | 422/300 |

*Primary Examiner*—Jimmy G. Foster
*Attorney, Agent, or Firm*—Trexler, Bushnell, Giangiorgi & Blackstone Ltd.

[57] ABSTRACT

A lens storage container in combination with a lens support structure in which a pair of lens hold members carrying a lens cover for each lens is independently pivotal upon a support frame, and a latch structure is provided for each of the holder members. The location of the latch structure above the lens enclosure prevents gravity action from pulling the lens downwardly into the path of the latch structure and these events any lens damage therefrom.

20 Claims, 2 Drawing Sheets

LATCHING STRUCTURE FOR CONTACT LENS HOLDER

BACKGROUND OF THE INVENTION

This invention relates to improved storage and holding containers for small articles, particularly for protection of fragile or pliable articles such as "soft" contact lenses.

The widely used soft contact lenses require protective storage containers which may also be used for disinfecting treatment of the lenses. Numerous commercially successful storage and disinfecting lens containers have been developed such as those described in U.S. Pat. No. 4,637,919, in which each lens of the pair is separately supported in a basket-like enclosure which is releasably retained in the closed or storage position by a latch. The basket-like enclosure is typically pivoted to open or close the enclosure. The latch is located below the pivoting cover of the basket enclosure so that under the action of gravity occasionally a carelessly placed lens will be pulled downwardly into the latching mechanism when the cover is pivoted closed. The lens may then be pinched by the latch structure, resulting in damage to the lens by the latch.

SUMMARY OF THE INVENTION

In accordance with this invention a lens storage container includes a lens support structure in which a pair of lens holder members carrying a lens cover for each lens is independently pivotal upon a support frame, and a latch structure is provided for each of the holder members. In the normal upright orientation of the container, the latch means is located above the lens cover in pivotally releasable latching engagement with the support frame to releasably retain the respective holder member in a closed position for enclosure of the lens by the cover. The location of the latch structure above the lens enclosure prevents gravity action from pulling the lens downwardly into the latch structure and any lens damage therefrom.

In a preferred embodiment, the latching structure includes a separate latching detent mounted on each of the holder members above the respective lens cover. The detent extends from a flange on the holder member, and at least a portion of the flange is resiliently deflectable away from the support frame enabling retraction of the detent to insert or release the holder member in the closed position. The flange can pivot through a clearance space formed between the support frame and a pivot bearing pin formed on the frame. The detent can have a wedge-shaped configuration including first and second legs of the wedge-shape and located so that a first of the legs is engageable against the support frame to provide releasable retentin of the respective holder member in the closed position, and the second of the legs is engageable with the support frame to provide releasable retention of the holder member in a fully open position for manual access to the lens.

DETAILED DESCRIPTION OF THE ILLUSTRATED EMBODIMENT

Figure 1:
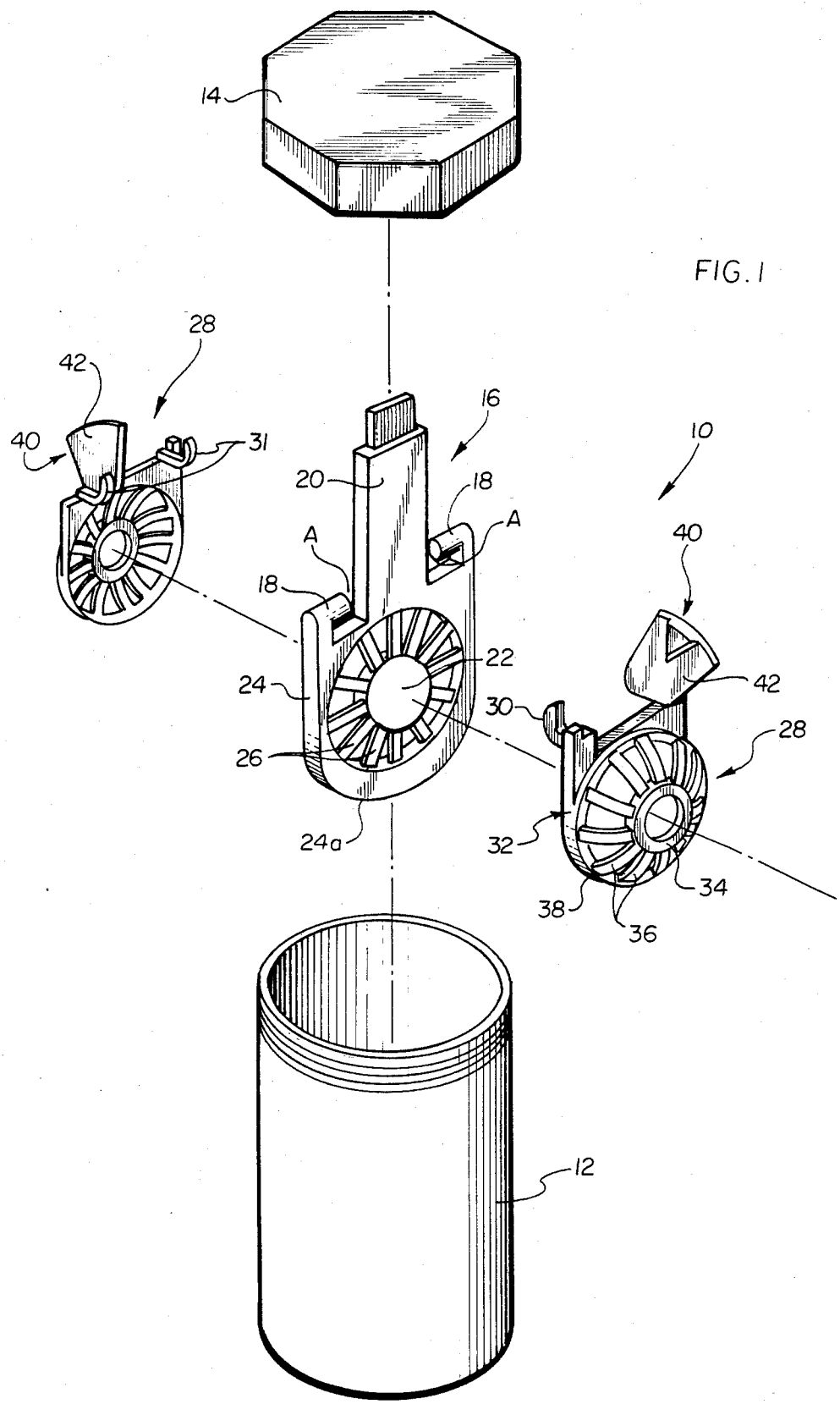
FIG. 1 is an exploded, perspective view of an embodiment of the storage appliance constructed in accordance with this invention.

Referring in more detail and by reference characters to the drawings, which illustrate a preferred embodiment of the present invention, shown is a lens case 10 comprising a container 12 with a generally cylindrical body having an end opening around which are formed threads for receiving the removable screw cap 14. The container 12 and the screw cap 14 are each molded from suitable plastic material. The cap 14 can have a venting conduit formed therein (not shown) for release of pressurized gas generated by a lens disinfection process carried out within the capped container, as more fully described in U.S. Pat. No. 4,637,919.

Figure 2:
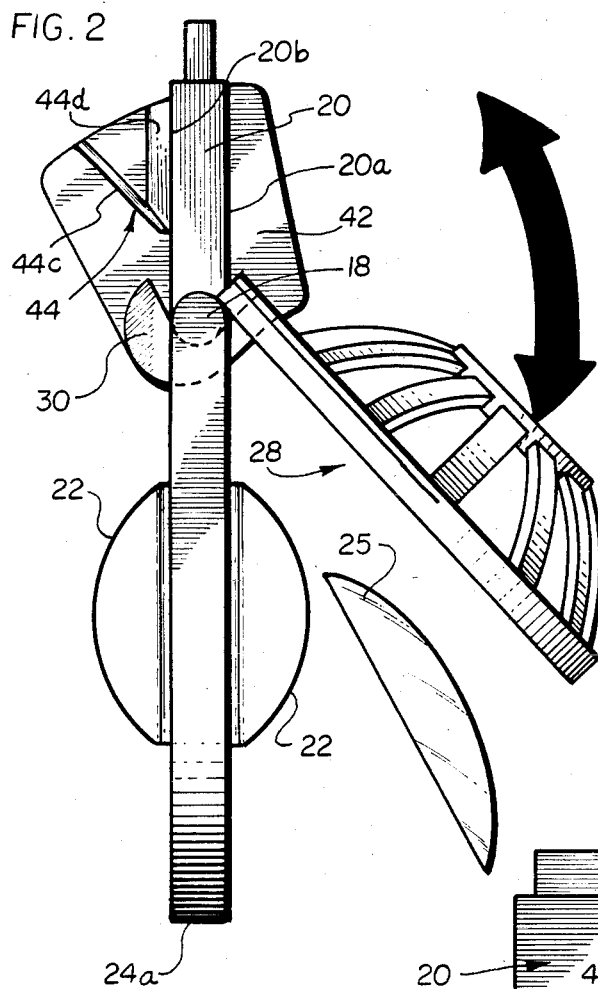
FIG. 2 is a side view of the lens supporting structure shown in FIG. 1, and illustrating pivotal motion of one of the two basket-like lens enclosures and a latching detent releasably restricting pivotal motion.

Depending and welding into the cap 14 is a lens-supporting frame 16 which projects downwardly into the container 12 when the cap 14 is mounted thereon. A pair of opposed, axially aligned trunions or pivot bearing pins 18, 18 are integrally molded adjacent the bottom frame 16. Integrally molded beneath the pins 13 is a button-like structure having opposed, convex lens-receiving surfaces 22, 22 (as best shown in FIG. 2) which are connected to a surrounding collar 24 by a series of spaced, radially arranged ribs 26, permitting passage of fluid through the frame 16. The surfaces 22, 22 receive the concave sides of the plastic contact lenses 25. The collar 24 has an arcuate bottom edge 24a.

Pivotally mounted on the pins 18, 18 are opposingly swinging lens holder or cover members 28, 28. At its upper end, each holder or cover member 28 has a spaced pair of arms 30, 30 which are pivotally supported on the bearing pins 18 as best shown in FIGS. 2 and 4.

The pivot arms 30 of each holder member 28 are snap-fit over the bearing pins 18, 18 so that each holder member 28 pivotally swings independently. Each holder member 28 includes a lens cover 32 integrally molded below the pivot arms 30. Each lens cover 32 includes an apertured annulus 34 and a series of curved spokes 36 radiating therefrom and joined to a surrounding rim 38. When the holder member 38 is in a fully closed position shown in FIG. 3 in which the rim 38 engages the collar 24, the cover 32 retains the lens 25 supported on the surface 15 while allowing passage of fluid through the spokes 36 to immerse the lens 25.

Each holder or cover member 28 further includes a latch 40 which alternately maintains either the pivotally closed position of the holder member 28 shown in FIG. 2 which allows access for insertion or removal of lens 25 from the retaining surface 22. Each latch 40 is formed above the lens cover 32 and includes an upstanding flange 42 which extends perpendicularly between the pivot arms 30 and bearing pins 18 relative to their axis. The flange 42 can be mounted on the holder member 28 by welding or other suitable securement.

Figure 3:
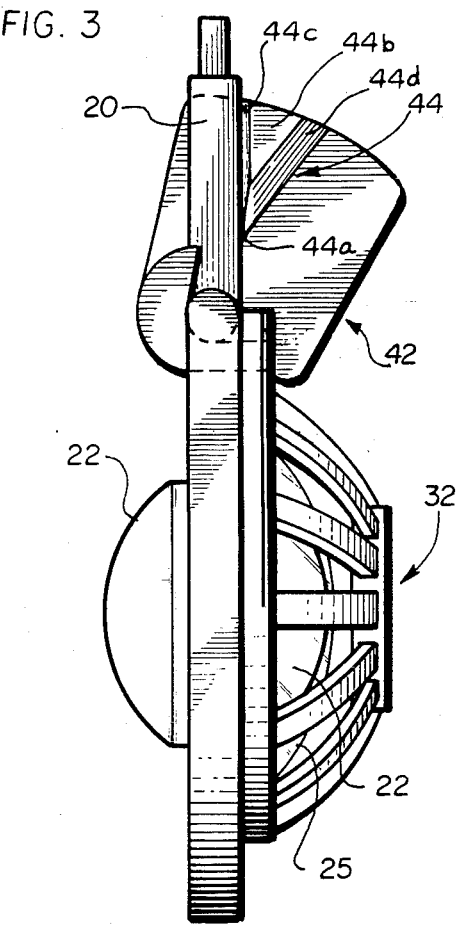
FIG. 3 is a side view similar to FIG. 2 illustrating the closed and latched position of the lens enclosure.
Figure 4:
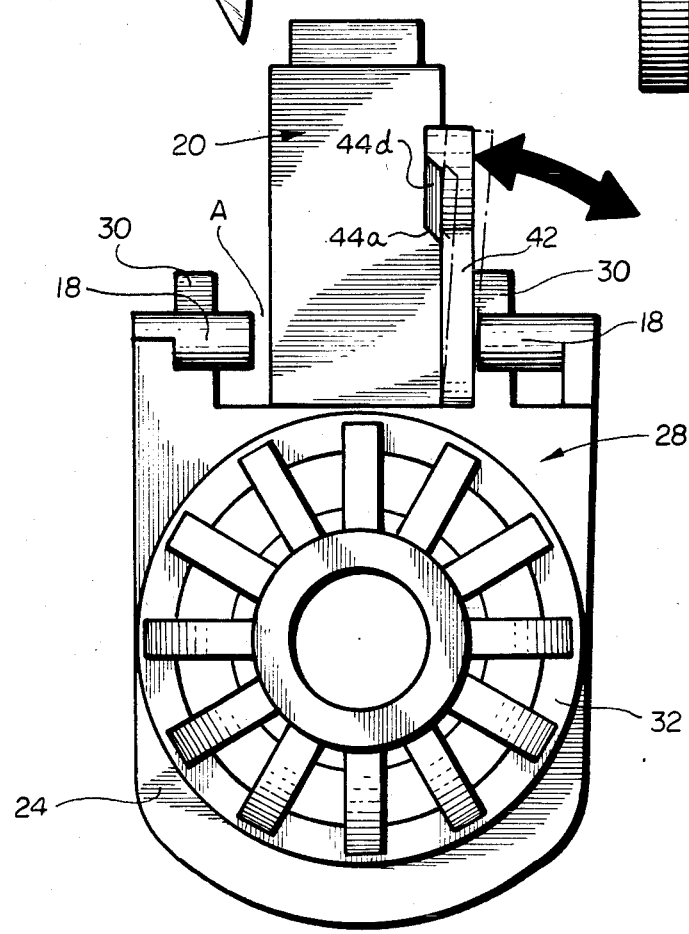
FIG. 4 is a front view of the structure in FIG. 3 illustrating the resilient deflection of the latching detent during opening and closing of the lens enclosure.

As best illustrated in FIGS. 1 and 4, the flange 42 is located offset to the right between the pivot arms 30 when viewing the lens cover 32 in the normal, vertical orientation of the holder member 28. The two flanges 42 are thus offset with respect to each other, and the lower portion of each flange 42 fits within a respective one of two clearance spaces designated A formed between an opposing edge of the stem 20 and a respective bearing pin 18 as shown in FIG. 1. In FIGS. 2–4, only one of the holder members 28 is shown mounted on the pivot pins 18 for clarity in illustrating the latch detail and to emphasize the offset location of the latch flange 42 in FIG. 4.

Each flange 42 has a wedge-shaped, latch detent 44 which slightly projects from the upper flange surface facing the stem. The wedge apex 44a is directed downwardly, but prefereably does not extend below the adjacent pivot arm 30 so that the latch detent 44 and the contiguous upper portion of the flange 42 can be resiliently deflected outwardly away from the stem 20 without excessive resistance to enable the facial surface 44b of the detent to slide against the edge surface of the stem 20 the holder member 28 is pivoted between the closed position of FIG. 3 and the open position of FIG. 2. In pivoting the holder member 28 into the closed position shown in FIG. 3, the wedge detent 44 is relieved inwardly from its previous outward deflection once the tapered leg 44c of the wedge 44 is pivoted into engagement against the stem edge corner 20a to latch and retain the wedge 44 and the entire holder member 28 in the closed position. This closed position is maintained until the latch wedge 44 is manually forced to deflect outwardly away from the stem 20 in order to open the holder member 28 during which the wedge surface 44b frictionally slides against the end edge of the stem 20.

The user can conveniently open only one cover 32 and holder member 28 at a time by pressing on the free edge of the flange 42 in the appropriate pivotal direction with sufficient force to provide a snap action disengaging the wedge leg 44c from the stem corner 20a, and outwardly deflecting the wedge 44 away from the stem 20. When the fully open position of FIG. 2 is reached, similar snap action inwardly relieves the deflection of the wedge 44 and moves the other leg 44d into engagement with the stem corner 20b.

In the fully opened position of the holder member 28, the inwardly relieved condition of the latch wedge 44 is maintained by the latching engagement of the tapered leg 44d against the corner 20b of the stem edge. This latching engagement retains the holder member 28 in the opened position until deliberately forced outward deflection of the wedge is imposed by manual reverse pivoting of the flange 42 and holder member 28 in order to return the holder member 28 to the closed position of FIG. 3.

Both of the wedge legs 44c and 44d can have beveled surfaces in order to promote functional balance of the force necessary to pivotally displace the latch wedge 44 and the resistance necessary to normally retain the holder members 28 in the fully opened or closed positions illustrated, as governed by the deflection resistance of the latch flange 42.

Because the latch structure is located above the cover 32 and lens retaining surface 22, even a carelessly placed lens will be pulled downwardly by the action of gravity away from the latch structure so that the lens cannot be accidentally perforated or sheared between the latch flange 42 and the stem 20 in opening or closing the enclosure, in contrast to lens damage caused by previous latch structures formed below the lens retaining enclosure.

In light of the foregoing description of the embodied storage container, modifications will be evident to those skilled in the art and are within the broad scope of the appended claims.

The invention is claimed as follows:

1. An appliance for storing contact lenses comprising a container including a body with an open end and a removable cap closing the end, a lens support structure secured to said cap for holding a pair of lenses within said container, said lens support structure comprising; a support frame with pivot bearing means formed thereon: and a pair of pivotal, elongate lens holder members, each holder member providing a lens cover portion and being pivotably supported on said bearing means: said support structure further comprising latch means located vertically above said lens cover portions and between said lens cover portions and said cap, said latch means being in releasable latching engagement with said support frame releasably to retain said respective holder member in a closed position for enclosure of said respective lens by said cover portion.

2. The appliance according to claim 1 wherein said latch means is frictionally slidable in interference engagement against said support frame to pivotally insert or release said holder member from said closed position.

3. The appliance according to claim 2 wherein said latch means includes means for maintaining said holder member in an open position for manual access to said lens.

4. The appliance according to claim 1, wherein said latch means includes a detent resiliently deflectable away from said support frame with said pivotal motion of said holder member.

5. The appliance according to claim 1 wherein said latch means is located above said pivot arms.

6. An appliance for storing contact lenses comprising a container including a body with an open end and a removable cap closing the end, a lens support structure for holding a pair of lenses within said container, said lens support structure comprising; a support frame with pivot bearing means formed thereon: and a pair of pivotal, elongate lens holder members, each holder member providing a lens cover portion and being pivotably supported on said bearing means: said support structure further comprising latch means located above said lens cover portions and in releasable latching engagement with said support frame releasably to retain said respective holder member in a closed position for enclosure of said respective lens by said cover portion, wherein said latch means includes a finger flange mounted adjacent said pivot arm for manual engagement to actuate said release of the latch means.

7. The appliance according to claim 6, wherein said holder members include a spaced pair of pivot arms engaging said bearing means, and wherein said finger flange is mounted in an offset location between said pivot arms.

8. The appliance according to claim 7, wherein said pivot bearing means includes a spaced pair of bearing pins and wherein each of said flanges is pivotally movable through a respective clearance space formed between said support frame and a respective one of said bearing pins.

9. The appliance according to claim 8, wherein said latch means further comprises a respective latching detent extending from and pivotal with said respective flange, each said detent being in retractable engagement with said support frame to provide said releasable retention of said respective holder member in its closed position.

10. The appliance according to claim 9, wherein each of said flanges includes at least a portion thereof being resiliently deflectable away from said support frame enabling said retraction of said respective detent therewith.

11. The appliance according to claim 10, wherein said detent comprises a wedge-shaped projection from said respective flange, said projection including first and second legs defining said wedge-shape, said first leg being engagable against said support frame to provide said releasable retention of said respective holder member in said closed position, and the second leg being engageable with said support frame to provide releasable retention of said respective holder member in an open position for manual access to said lens.

12. An appliance for storing contact lenses comprising a container including a body with an open end and a removable cap closing the end, a lens support structure secured to said cap for holding a pair of lenses within said container, said lens support structure comprising; a support frame with pivot bearing means formed thereon, and a pair of pivotal, elongate lens holder members, each holder member providing a lens cover portion and being pivotally supported on said bearing means; said lens support structure further comprising a latching detent located vertically above said lens cover portions and between said lens cover portions and said cap, said latch means being in releasable latching engagement with said support frame to releasably retain said respective holder member in a closed position for enclosure of said respective lens by said cover, said detent being resiliently deflectable away from said support frame with said pivotal motion of said holder member.

13. The appliance according to claim 12 wherein said detent is frictionally slidable in interference engagement against said support frame to pivotally insert or release said holder member from said closed position.

14. The appliance according to claim 13, wherein said detent is defined in wedge-shaped configuration including first and second legs defining said wedge-shape, said first leg being engageable against said support frame to provide said releasable retention of said respective holder member in said closed position, and the second leg being engageable with said support frame to provide releasable retention of said respective holder member in an open position for manual access to said lens.

15. The appliance according to claim 14 wherein said pivot bearing means includes a spaced pair of bearing pins and wherein said detent projects from a manually actuating flange mounted on one of said holder members, said flange being pivotally movable through a clearance space formed between said support frame and one of said bearing pins.

16. A lens support structure for holding a pair of contact lenses, said lens support structure including, a support frame including a stem portion and surface support means for the lens, and a pair of lens cover member having respective pivot arms pivotably mounted to said support frame for overlying said surface support means, and latch means located on an upper portion of said cover members and for releasable latching engagement with the stem portion of the support frame to retain the cover member in a closed overlying position with respect to said surface support means, wherein said latch means includes a finger flange mounted adjacent said pivot arm for manual engagement to actuate said release of the latch means.

17. The lens support structure according to claim 16 wherein said latch means comprises a latching detent resiliently deflectable away from said stem portion with pivotal motion of said cover member.

18. The lens support structure according to claim 17, wherein said detent is frictionally slidable in interference engagement against said stem portion to pivotally insert or release said cover member from said closed position.

19. The lens support structure according to claim 18, wherein said detent is defined in wedge-shaped configuration including first and second legs defining said wedge-shape, said first leg being engageable against said stem portion to provide said releasable retention of said respective cover member in said closed position, and the second leg being engageable with said stem portion to provide releasable retention of said respective holder member in an open position for manual access to said lens.

20. A lens support structure for holding a pair of contact lenses, said lens support structure including, a support frame including a stem portion and surface support means for the lens, and a pair of lens cover members pivotably mounted to said support frame for overlying said surface support means, and latch means located on an upper portion of said cover members and for releasable latching engagement with the stem portion of the support frame to retain the cover member in a closed overlying position with respect to said surface support means, said latch means comprising a latching detent resiliently deflectable away from said stem portion with pivotal motion of said cover member, and, wherein said support frame includes a spaced pair of flange being pivotally movable through a clearance space formed between said stem portion and one of said bearing pins, said detent is defined in wedge-shaped configuration including first and second legs defining said wedge-shape, said first leg being engageable against said stem portion to provide said releasable retention of said respective cover member in said closed position, and the second leg being engageable with said stem portion to provide releasable retention of said respective holder member in an open position for manual access to said lens.

* * * * *